United States Patent
Iyechika et al.

(10) Patent No.: US 9,995,632 B2
(45) Date of Patent: Jun. 12, 2018

(54) RADIATION THERMOMETER AND THERMOMETRY METHOD

(71) Applicant: NUFLARE TECHNOLOGY, INC., Kanagawa-ken (JP)

(72) Inventors: Yasushi Iyechika, Chiba (JP); Masato Akita, Kanagawa (JP)

(73) Assignee: NuFlare Technology, Inc., Kanagawa (JP)

( * ) Notice: Subject to any disclaimer, the term of this patent is extended or adjusted under 35 U.S.C. 154(b) by 387 days.

(21) Appl. No.: 14/880,561

(22) Filed: Oct. 12, 2015

(65) Prior Publication Data

US 2016/0109299 A1    Apr. 21, 2016

(30) Foreign Application Priority Data

Oct. 20, 2014    (JP) ................................. 2014-213906

(51) Int. Cl.
    *G01J 5/00*    (2006.01)
    *G01J 5/08*    (2006.01)
    *G01J 5/60*    (2006.01)

(52) U.S. Cl.
    CPC ........... *G01J 5/0862* (2013.01); *G01J 5/0007* (2013.01); *G01J 5/0896* (2013.01); *G01J 5/602* (2013.01);
    (Continued)

(58) Field of Classification Search
    CPC ............. G01J 2005/0048; G01J 5/0007; G01J 5/0896; G01J 5/602; G01J 5/00
    (Continued)

(56) References Cited

U.S. PATENT DOCUMENTS

| | | | |
|---|---|---|---|
| 6,448,097 B1 * | 9/2002 | Singh | G01N 21/64 250/492.22 |
| 7,593,158 B2 * | 9/2009 | Wilhelm | G01N 21/6458 250/459.1 |

(Continued)

FOREIGN PATENT DOCUMENTS

| | | |
|---|---|---|
| JP | 10-111186 | 4/1998 |
| JP | 4054526 | 2/2008 |

(Continued)

OTHER PUBLICATIONS

Japanese Office Action dated Apr. 20, 2018 issued in the corresponding Japanese patent application No. 2014-213906 and its English translation.

*Primary Examiner* — Gail Kaplan Verbitsky
(74) *Attorney, Agent, or Firm* — Rankin, Hill & Clark LLP

(57) ABSTRACT

A radiation thermometer has a broadband light source which generates broadband light; an optical filter which, when the broadband light is incident on the measuring target object, passes only light in a predetermined wavelength range of reflected light and heat radiation light from a measuring target object; a light receiver which receives the light in the predetermined wavelength range through the optical filter; and a calculator which calculates a temperature of the measuring target object by using reflected light intensity and heat radiation intensity of the light in the predetermined wavelength range received by the light receiver, wherein an emission spectrum of the broadband light is a spectrum with a full width at half maximum which is equal to or wider than the predetermined wavelength range, and with light intensity increasing while a wavelength thereof becomes longer in the predetermined wavelength range.

15 Claims, 7 Drawing Sheets

(52) U.S. Cl.
CPC ................ *G01J 2005/0048* (2013.01); *G01J 2005/0051* (2013.01)

(58) Field of Classification Search
USPC ..................................................... 356/43, 44
See application file for complete search history.

(56) References Cited

U.S. PATENT DOCUMENTS

| | | | | |
|---|---|---|---|---|
| 2005/0160791 | A1* | 7/2005 | Kung | ..................... G01N 21/05 |
| | | | | 73/24.02 |
| 2005/0244982 | A1* | 11/2005 | Menon | ................... G01N 21/39 |
| | | | | 436/164 |
| 2009/0080880 | A1* | 3/2009 | Lee | ..................... H04B 10/071 |
| | | | | 398/14 |
| 2010/0182605 | A1* | 7/2010 | Stockwell | ................. G01J 3/12 |
| | | | | 356/436 |
| 2015/0146193 | A1* | 5/2015 | Buczkowski | ...... G01N 21/6489 |
| | | | | 356/72 |
| 2016/0274361 | A1* | 9/2016 | Border | ............... G02B 27/0176 |
| 2017/0250227 | A1* | 8/2017 | Park | ..................... H01L 27/307 |

FOREIGN PATENT DOCUMENTS

| | | |
|---|---|---|
| JP | 2009-500851 | 1/2009 |
| WO | 2004-010094 | 1/2004 |

* cited by examiner

| λ0 (μm) | Δλ (μm) | PREFERRED RANGE OF Ph/Pl |
|---|---|---|
| 1 | 0.20 | 3.0 ~ 5.5 |
| | 0.15 | 2.3 ~ 3.6 |
| | 0.10 | 1.7 ~ 2.3 |
| | 0.05 | 1.3 ~ 1.5 |
| 0.9 | 0.20 | 4.5 ~ 9.4 |
| | 0.15 | 3.1 ~ 5.3 |
| | 0.10 | 2.1 ~ 3.0 |
| | 0.05 | 1.4 ~ 1.7 |
| 0.8 | 0.20 | 7.9 ~ 20.1 |
| | 0.15 | 4.7 ~ 9.3 |
| | 0.10 | 2.8 ~ 4.4 |
| | 0.05 | 1.7 ~ 2.1 |

RADIATION THERMOMETER AND THERMOMETRY METHOD

CROSS REFERENCE TO RELATED APPLICATIONS

This application is based upon and claims the benefit of priority from the prior Japanese Patent Application No. 2014-213906, filed on Oct. 20, 2014, the entire contents of which are incorporated herein by reference.

FIELD

Embodiments of the present invention relate to a radiation thermometer and a thermometry method.

BACKGROUND

A radiation thermometer is for measuring heat radiation intensity (heat emission intensity) radiated from a measuring target object, so as to obtain the temperature of the measuring target object. This radiation thermometer has a characteristic of being able to measure the temperature of the measuring target by a relatively short time without contacting the measuring target object, and thus has a high industrial value. When the temperature of a measuring target object is measured particularly under the circumstances that conditions of temperature, pressure, atmosphere, and the like are changed largely from the external environment, the aforementioned characteristic is exhibited effectively. Moreover, when the measuring target object moves, the characteristic of the radiation thermometer of being a non-contact type is important.

Examples of industrial application using the radiation thermometer include production of semiconductors, production of compound semiconductors containing a nitride system, and the like. In order to produce high-quality semiconductors with high purity, in most cases, the interior of a manufacturing apparatus is isolated from the outside and a substrate retained in the interior of the manufacturing apparatus is heated to a high temperature. In particular, metal organic chemical vapor deposition (MOCVD) for performing film formation on a substrate by subjecting to a chemically active material gas, or molecular beam epitaxy (MBE) for forming a film on a substrate by evaporating constituent elements of a semiconductor in a high vacuum are well known.

For these semiconductor manufacturing apparatuses very precise temperature measurement is required so as to favorably keep uniformity and repeatability of semiconductors produced. As a specific example, the temperature of a measuring target object is in the range of 600° C. to 1200° C., and measurement precision is ±2° C. or less. In practice, in production of a light-emitting element with a multiple quantum well constituted of InGaN (indium gallium nitride) and GaN (gallium nitride) being a light-emitting layer, in the process of producing this light-emitting layer, the substrate is retained at a certain temperature determined from other manufacturing conditions within the range of about 700° C. to 800° C. This certain temperature largely affects the emission wavelength of the light-emitting element, and thus precise temperature measurement as described above is necessary for realizing high emission wavelength uniformity and repeatability.

On the other hand, in order to accurately measure the temperature of a measuring target object by using the radiation thermometer, a value of emissivity of the measuring target object is necessary. As the temperature of an object increases, heat radiation intensity from the object increases, and thus it is possible to measure the temperature of the object by measuring the heat radiation intensity from the object. However, heat radiation intensity from a general object is smaller than heat radiation intensity of a blackbody at the same temperature. The emissivity is obtained by dividing heat radiation intensity from an object at a certain temperature by the intensity of heat radiation from the blackbody at the same temperature. Therefore, by measuring the heat radiation intensity from an object and dividing this heat radiation intensity by the emissivity of this object, the intensity of heat radiation radiated by the blackbody at the same temperature as this object can be obtained, and the temperature of the object can be calculated from this heat radiation intensity. The radiation thermometer using the principle described here can respond to changes of optical parts in various configurations between the radiation thermometer and the measuring target by performing calibration at an appropriate temperature, without performing calibration using the blackbody in a wide temperature range.

Emissivity is measured with various materials, and is published in various documents. In general, many radiation thermometers have a function to store emissivity and use it to correct the intensity of heat radiation from an object, and when the emissivity of the material of a measuring target object is known by a document value or the like, this can be stored for use in the radiation thermometer. However, the emissivity depends not only on the material of the measuring target object but also on the surface condition or temperature. In this sense, the published emissivity is difficult to be used for precise thermometry.

On the other hand, under certain limited conditions, it is possible to measure emissivity. That is, in the wavelength range of light for measuring heat radiation intensity, when the light does not pass through the measuring target object and the light irradiated to the surface of the measuring target object does not scatter, the emissivity ($\epsilon$) is represented by an equation $\epsilon=1-R$, where R is the reflectivity of light on the surface of the measuring target object. Therefore, in the wavelength range of light for measuring heat radiation intensity, when the surface of the measuring target object has sufficient specularity and it is possible to measure the reflectivity of the measuring target object by using an external light source, and the measuring target object absorbs light, the emissivity can be obtained irrespective of the surface condition and temperature of the measuring target object. In order to measure the temperature of the measuring target object with high precision by using such a method, it is crucial to accurately obtain the intensity of heat radiation from the measuring target object and the reflectivity with a preset wavelength.

The radiation thermometer which measures the temperature while obtaining the emissivity of the measuring target object as described above is particularly important for measuring substrate temperature when a thin film is formed on the substrate. In the process of forming the thin film on the substrate, due to occurrence of interference of light by the thin film, the emissivity of the substrate including the thin film changes constantly as the film formation proceeds (the film becomes thick). By this change in emissivity, even when the temperature of the measuring target object is constant, the intensity of heat radiation from the measuring target object changes. Even in such case, when conditions as described above are satisfied, correction of emissivity can be made by measuring the reflectivity appropriately by using the external light source.

However, in order to decrease noise in signals in measurement of heat radiation intensity, it is necessary to widen the wavelength range of light for measuring heat radiation intensity, so as to increase the light intensity to be detected with a detector. For example, when a wavelength band pass filter with a center wavelength of 950 nm and a selected wavelength range of ±25 nm is used (width of the wavelength range=50 nm), signal strength which is five times larger can simply be expected as compared to when the center wavelength is the same and the wavelength range is ±5 nm (width of the wavelength range=10 nm). By obtaining such large signal strength, thermometry becomes possible at low temperatures at which the heat radiation intensity becomes small, allowing lowering the lower limit of the measured temperature. It also becomes possible to obtain sufficient signal strength in a short time, enabling thermometry at higher speed.

On the other hand, mainly two factors are conceivable for the upper limit of the wavelength range for measuring the above-described heat radiation intensity. The first factor is ascribed to that emission energy by heat radiation has wavelength dependence. This wavelength dependence differs depending on the temperature of the measuring target. When the temperature of the blackbody is less than or equal to 1200° C., in the wavelength region of shorter wavelengths than near-infrared, the emission energy becomes smaller as the wavelength becomes shorter. Therefore, when heat radiation is monitored in a certain wavelength range and a temperature is calculated by using the equation of radiation of the blackbody from the measurement values thereof, an error occurs. A specific example is illustrated in FIG. 13. In FIG. 13, for the wavelength range measuring the heat radiation, an upper limit is 1000 nm and a lower limit is varied, and the temperature is calculated by using the equation of radiation of the blackbody from the heat radiation intensity in the measuring wavelength range. The calibration temperature is 1000° C., and the temperature of the measuring target is 600° C. From FIG. 13, it can be seen that when the lower limit of the wavelength for measuring heat radiation intensity is 900 nm (wavelength range is 100 nm), the error in the temperature is about 2° C., and that the error increases as the lower limit of the wavelength shortens (the wavelength range becomes larger). In order to make the error in the measured temperature at 600° C. be 10° C. or less, the lower limit of the wavelength is 800 nm (the wavelength range is 200 nm). The error in the measured temperature due to the first factor is determined by the measuring wavelength range of heat radiation intensity and the temperature of the measuring target. When only the first factor occurs, even when temperature control is performed based on measured temperatures, although there are errors in absolute values, stable control is possible and also the repeatability is good.

The second factor is ascribed to change in emissivity by forming the thin film on the substrate. When the selected wavelength range becomes wider, particularly when light absorption within the selected wavelength range is small in the thin film formed on the substrate, the influence of interference within the wavelength range for measuring heat radiation intensity becomes non-negligible as the thickness of the thin film increases. Specifically, when the heat radiation intensity distribution with respect to wavelength in the selected wavelength range changes more largely than when it is substantially constant, heat radiation intensity monitored in the selected wavelength range no longer faithfully reflects the heat radiation intensity at the center wavelength, resulting in that the measured heat radiation intensity containing a large error. The error due to the second factor depends on the thickness of the thin film formed on the substrate, and even when the temperature of the measuring target is constant, the apparent temperature would change. When, conversely, the temperature is controlled based on the measured temperature while the thin film is formed, the temperature of the measuring target actually changes, which is a big problem in control of temperature. Even if the temperature of the measuring target is the same, if the thickness of the thin film formed on the substrate is not the same, there is basically no repeatability in measured temperatures. To solve this problem, it is effective to decrease the wavelength range for measuring heat radiation intensity, so as to improve the precision of measurement of emissivity.

Thus, in the conventional radiation thermometer which corrects the emissivity, the precision of heat radiation intensity is lowered when the wavelength range for measuring heat radiation intensity is widened, and conversely when it is narrowed the signal strength of heat radiation intensity decreases, thus having problems that the measured temperature region becomes narrow, or that a long measurement time is needed, and so on.

An object to be achieved by the present invention is to provide a radiation thermometer and a thermometry method which are, without changing the wavelength range for measuring heat radiation intensity, capable of suppressing lowering the precision and the signal strength of heat radiation intensity so as to improve thermometry precision.

SUMMARY

According to an aspect of the present invention, a radiation thermometer, comprising:

a broadband light source configured to generate broadband light to be irradiated to a measuring target object;

an optical filter configured to, when the broadband light generated by the broadband light source is incident on the measuring target object, pass only light in a predetermined wavelength range of reflected light reflected by the measuring target object and heat radiation light radiated from the measuring target object;

a light receiver configured to receive the light in the predetermined wavelength range which passed through the optical filter; and a calculator configured to calculate a temperature of the measuring target object by using reflected light intensity and heat radiation intensity of the light in the predetermined wavelength range received by the light receiver, wherein an emission spectrum of the broadband light is a spectrum with a full width at half maximum which is equal to or wider than the predetermined wavelength range, and with light intensity increasing while a wavelength thereof becomes longer in the predetermined wavelength range.

DETAILED DESCRIPTION

Embodiments will now be explained with reference to the accompanying drawings. The present invention is not limited to the embodiments.

Figure 1:
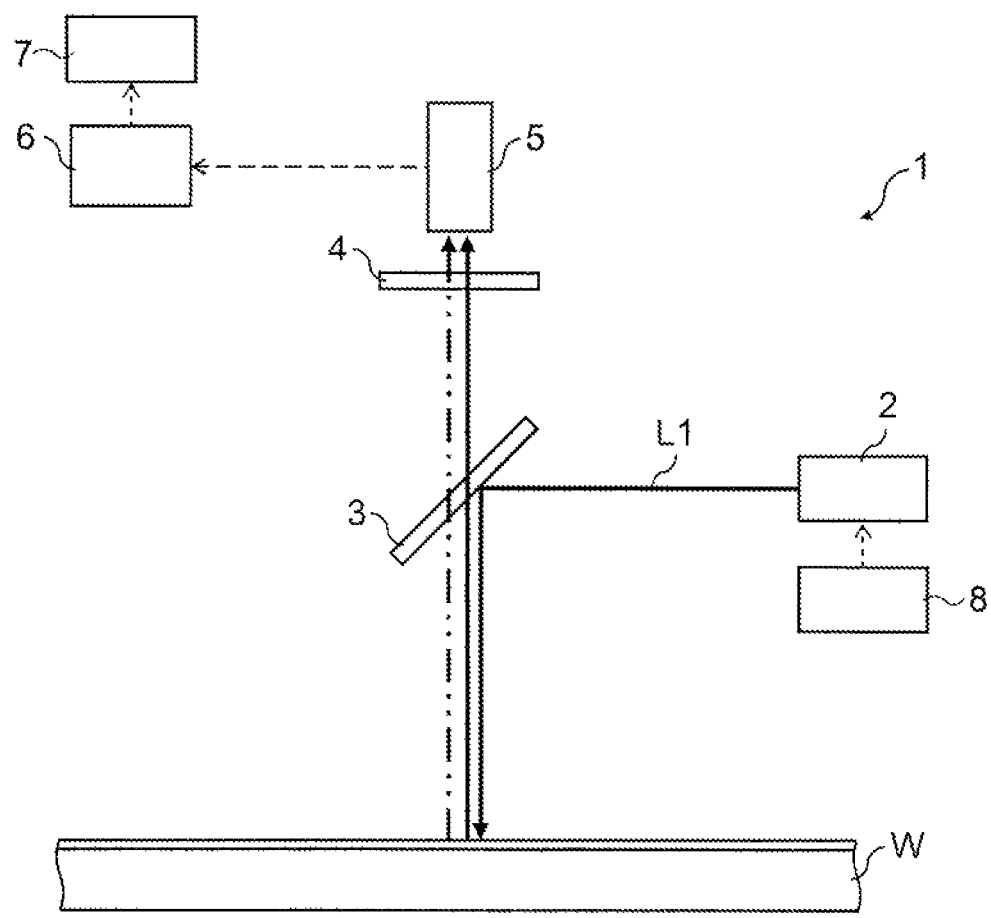
FIG. 1 is a diagram illustrating a schematic structure of a radiation thermometer according to one embodiment.

As illustrated in FIG. 1, a radiation thermometer 1 according to one embodiment includes a broadband light source 2 which generates broadband light L1 irradiated to a measuring target object W, such as a semiconductor substrate (wafer), a half mirror 3 which reflects the broadband light L1 generated by the broadband light source 2 toward the measuring target object W, an optical filter 4 which passes only light in a predetermined wavelength range of light received from the measuring target object W, a light receiver 5 which receives the light in the predetermined wavelength range which passed through the optical filter 4, and a calculator 6 which calculates a temperature of the measuring target object W by using reflected light intensity and heat radiation intensity (heat radiation light intensity) of the light in the predetermined wavelength range received by the light receiver 5.

This radiation thermometer 1 is used, for example, to measure the temperature of the measuring target object W when a thin film is formed on the measuring target object W, and is provided above a film forming apparatus (not illustrated) which generates a film on a surface of the measuring target object W. In this film forming apparatus, the measuring target object W is mounted in a film forming chamber maintained at atmospheric pressure or reduced pressure, and gases as raw materials for film formation are supplied into the film forming chamber while the measuring target object W is heated, so as to form the film on the surface of the measuring target object W. In this film forming step, the measuring target object W is heated, for example, within the range of 600° C. or more and 1200° C. or less.

When the temperature of the measuring target object W is measured, the broadband light L1 is emitted by the broadband light source 2, and the broadband light L1 emitted by the broadband light source 2 is reflected by the half mirror 3, passes through an optical transmission window of the film forming apparatus, and is irradiated to the measuring target object W, more specifically, a substrate and a thin film formed on the substrate. Thereafter, reflected light of the light L1 incident on the measuring target object (the substrate and the thin film formed on the substrate) W and the heat radiation light (heat emission light) radiated from the measuring target object W pass through the half mirror 3 and the optical filter 4, and only the light in the predetermined wavelength range is received by the light receiver 5 and is detected as an electric signal. The detected signal is transmitted to the calculator 6, and the temperature of the measuring target object W is calculated by the calculator 6 and is finally displayed on a display 7. Note that the display 7 is an example of an outputter which outputs the temperature calculated by the calculator 6, and the outputter can be made of, for example, a printing device or a storage device.

In the temperature calculation of the measuring target object W by the calculator 6, the emissivity of the measuring target object W is obtained based on the measured reflected light intensity (reflectivity), and the heat radiation intensity (heat radiation light intensity) from the measuring target object W is divided by the emissivity of the measuring target object W. Thus, there is obtained heat radiation intensity radiated by a blackbody at the same temperature as the measuring target object W, and the temperature of the measuring target object W is calculated from this heat radiation intensity. That is, the predetermined wavelength range detected in the light receiver 5 is the wavelength range for measuring heat radiation intensity.

In order to separate the signals of the reflected light intensity and the heat radiation intensity from the measuring target object W in such thermometry, there can be used, for example, a method to blink the light from the broadband light source 2 at an appropriate cycle by a controller 8, and separate a signal corresponding to this cycle from light intensity detected by the light receiver 5, or the like. At this time, the calculator 6 functions as a separator which separates and uses the signals of the heat radiation intensity and the reflected light intensity from the measuring target object W according to the above-described cycle.

Here, the reflected light intensity and the heat radiation intensity from the measuring target object W can be considered as a wavelength integral of intensity in a selected predetermined wavelength range or an average value in the selected predetermined wavelength range. Further, in the example of FIG. 1, it is possible to adjust the predetermined wavelength range with the optical filter 4. This optical filter 4 is constituted of, for example, a band-pass filter, functioning as a wavelength selecting filter which selects light in a predetermined wavelength range from the broadband wavelength light, blocking light except in the predetermined wavelength range from the broadband wavelength range, and passing only the light in the predetermined wavelength range.

Figure 2:
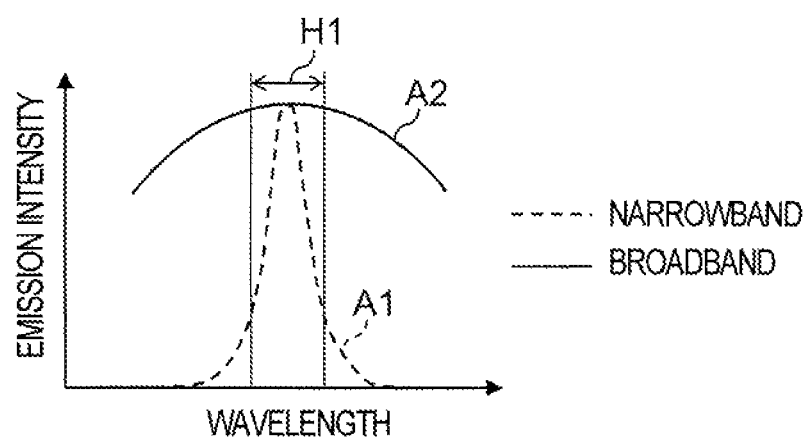
FIG. 2 is a diagram illustrating emission spectra of broadband light and narrowband light according to one embodiment.

As illustrated in FIG. 2, light in a narrowband is light with emission intensity which is present only in a narrowband (narrow wavelength band) (see A1 in FIG. 2). On the other hand, light in a broadband is light with emission intensity which is present in a broadband (broad wavelength band) (see A2 in FIG. 2). At least a full width at half maximum (FWHM) of the light in the broadband is equal to or more than a width H1 of the predetermined wavelength range for measuring heat radiation intensity. Hereinafter, the light in the narrowband will simply be described as narrowband light, the light in the broadband as broadband light, the full width at half maximum as a width at half maximum, and the predetermined wavelength range for measuring heat radiation intensity as a measuring wavelength range.

When the measured temperature is in the range of 500° C. to 1200° C. for example, it is preferred that the center wavelength of the measuring wavelength range be 950 nm, and the wavelength range be in the range of ±25 nm to ±100 nm of the center wavelength, that is, the width H1 of the measuring wavelength range be in the range of 50 nm or more and 200 nm or less. Note that the width at half maximum of the broadband light is equal to or more than the width H1 of the measuring wavelength range.

Figure 3:
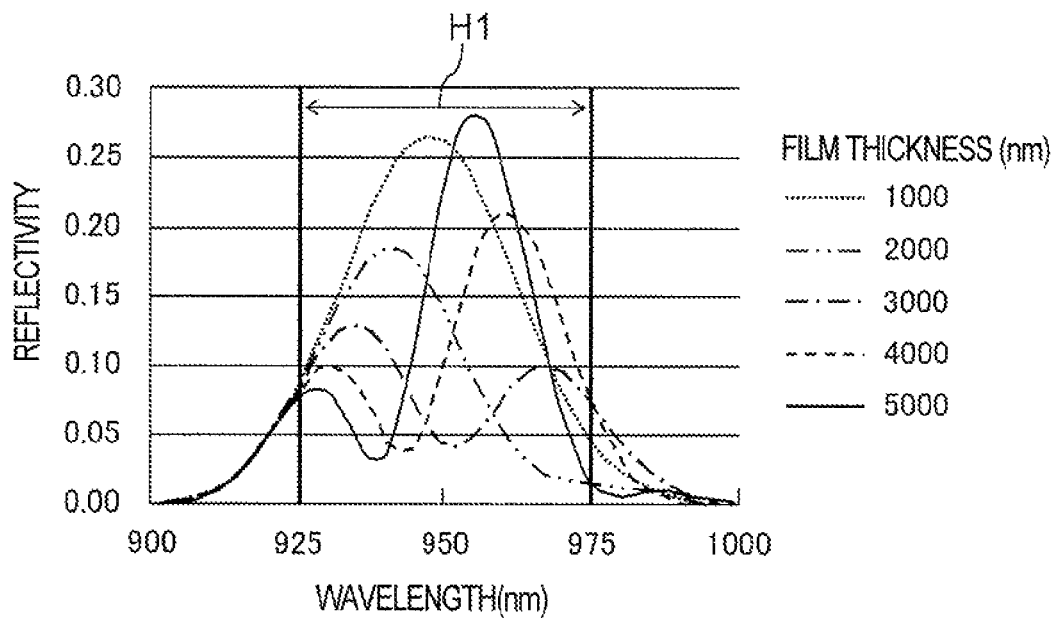
FIG. 3 is a diagram illustrating reflection spectra of narrowband light according to one embodiment.
Figure 4:
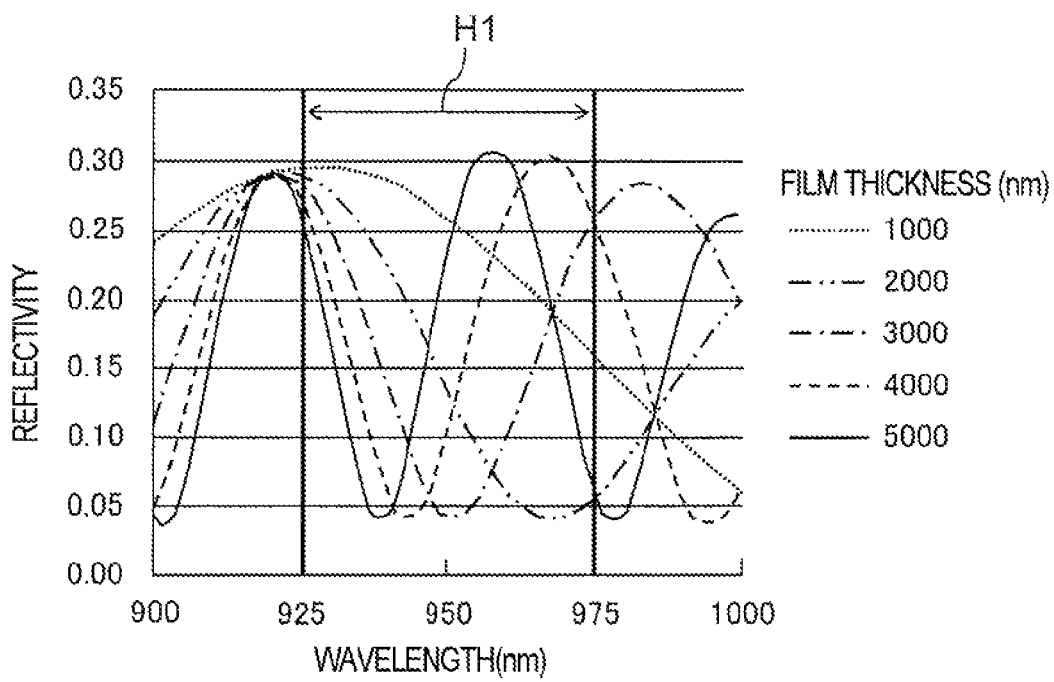
FIG. 4 is a diagram illustrating reflection spectra of wideband light according to one embodiment.

Next, the influence of a change in the film thickness on the measuring target object. W on the reflectivity will be explained with reference to FIG. 3 to FIG. 5. FIG. 3 illustrates an example of a reflection spectrum of the narrowband light, and FIG. 4 illustrates an example of a reflection spectrum of the broadband light. Further, FIG. 5 illustrates the emission spectra of narrowband light and broadband light with a center wavelength of 950 nm, which are used as models.

In FIG. 3 and FIG. 4, the influence of a change in the film thickness on the measuring target object W on the reflectivity is evaluated by model calculation in a range of ±25 nm (wavelength interval H1=50 nm) with respect to the center wavelength of 950 nm. Particularly when silicon is used as the substrate and a gallium nitride (GaN) is used as the thin film formed on the substrate, how the reflection spectrum of each of film thicknesses (1000 nm, 2000 nm, 3000 nm, 4000 nm and 5000 nm) of GaN changes is evaluated.

Figure 5:
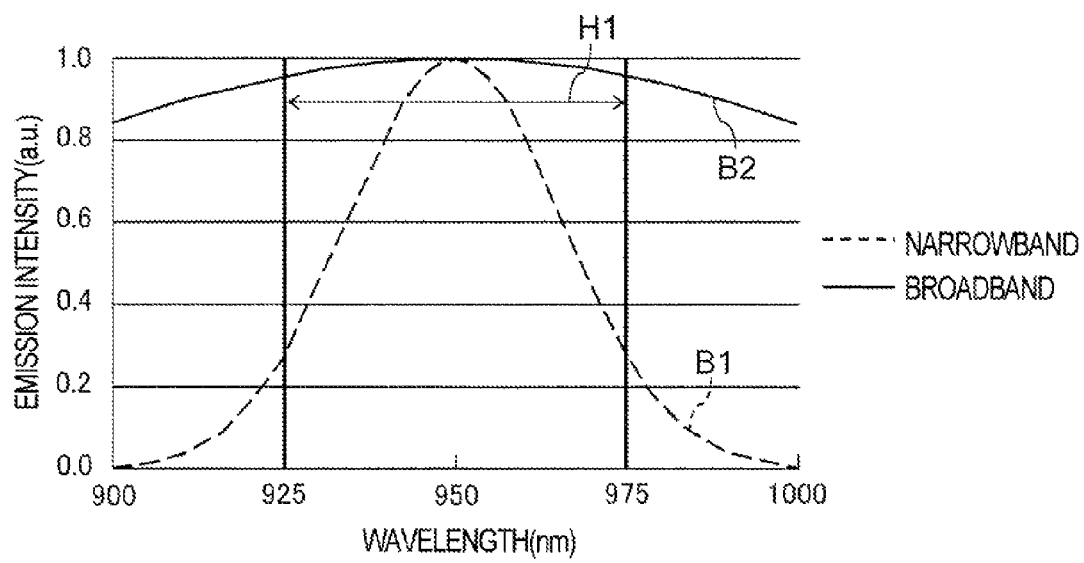
FIG. 5 is a diagram illustrating emission spectra of broadband light and narrowband light used as models according to one embodiment.

Note that as illustrated in FIG. 5, the narrowband light is light in which the width at half maximum (full width at half maximum) of the emission spectrum is 37 nm, the width at half maximum being smaller than the wavelength interval H1 (=50 nm) (see B1 in FIG. 5). The broadband light is light in which the width at half maximum (full width at half maximum) of the emission spectrum is 200 nm, the width at half maximum being larger than 50 nm (see B2 in FIG. 5). That is, FIG. 3 is a diagram illustrating the reflection spectrum of the measuring target object W related to each film thickness of the narrowband light B1 illustrated in this FIG. 5, and similarly, FIG. 4 is a diagram illustrating the reflection spectrum of the measuring target object W related to each film thickness of the broadband light B2 illustrated in this FIG. 5.

As illustrated in FIG. 3, the reflection spectrum of the narrowband light changes in its shape (degree of increase or decrease in reflectivity) as the film thickness increases, specifically, as it increases as 1000 nm, 2000 nm, 3000 nm, 4000 nm and 5000 nm. Similarly, each reflection spectrum of the broadband light, as illustrated in FIG. 4, changes also in its shape (degree of increase or decrease in reflectivity) as the film thickness increases, specifically, as it increases as 1000 nm, 2000 nm, 3000 nm, 4000 nm and 5000 nm. When these FIG. 3 and FIG. 4 are compared, it can be seen that the reflection spectrum of the broadband light changes largely over the measuring wavelength range as compared to the reflection spectrum of the narrowband light.

Figure 6:
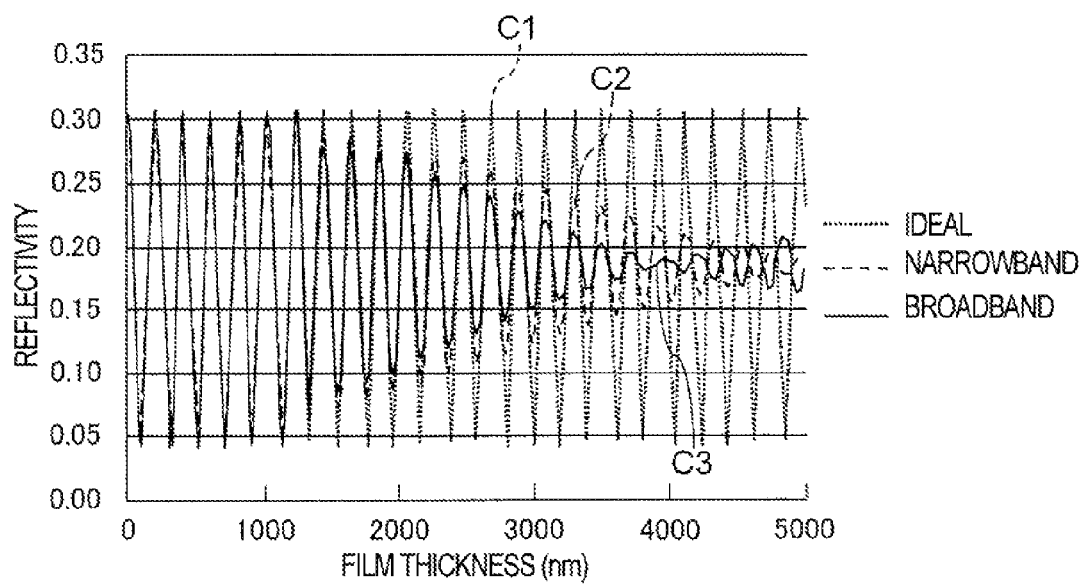
FIG. 6 is a diagram illustrating film thickness dependence of reflectivity according to one embodiment.

Next, the influence of spectral difference between ideal light, the narrowband light and the broadband light, that is, difference in width at half maximum of each emission spectrum on the reflectivity will be explained with reference to FIG. 6. FIG. 6 illustrates film thickness dependence of the reflectivity, that is, the relation between the reflectivity and the film thickness, of each of the ideal light, the narrowband light and the broadband light. Here, the ideal light is light having high coherence and the width at half maximum of the emission spectrum is so small that it can be ignored, like a laser for example.

In FIG. 6, similarly to the above description, the influence of the ideal light, the narrowband light and the broadband light (difference in the width at half maximum of each emission spectrum) with a center wavelength of 950 nm on the reflectivity is evaluated by model calculation in a range of ±25 nm (wavelength interval H1=50 nm) with respect to the center wavelength of 950 nm. In the model calculation, silicon is assumed to be the substrate and gallium nitride (GaN) as the thin film formed on the substrate. FIG. 6 shows how the reflectivity changes as the film thicknesses of GaN increases. Note that the emission spectra of the narrowband light and the broadband light used in the model calculation are those illustrated in FIG. 5, similarly to the above description. Calibration of temperature is performed at 1000° C. by using the substrate before the thin film is formed.

As illustrated in FIG. 6, it can be seen that the ideal reflectivity at 950 nm repeats oscillations in the form of a sine wave as the film thickness increases (see C1 in FIG. 6). This behavior is equivalent to cases where the width at half maximum of the emission spectrum is 0, and the amplitude of oscillations of the reflectivity is constant and does not change. On the other hand, when the reflectivity is measured by using a light source in which the width at half maximum of the emission spectrum of the narrowband light is 37 nm (see C2 in FIG. 6), it can be seen that the amplitude of oscillations of the reflectivity gradually decreases as the film thickness increases. When the film is grown to approximately 5 μm (5000 nm), the measured reflectivity is approximately 17% and the amplitude becomes substantially 0. Moreover, when a light source in which the width at half maximum of the emission spectrum of the broadband light is 200 nm is used (see C3 in FIG. 6), attenuation of the amplitude of oscillations of the reflectivity is faster, and the amplitude of oscillations of the reflectivity becomes substantially 0 at the stage that the film is grown by 4 μm (4000 nm). Thus, as the width at half maximum of the emission spectrum of the broadband light source 2 for measuring the reflectivity increases, the amplitude of oscillations of the reflectivity measured becomes small.

Figure 7:
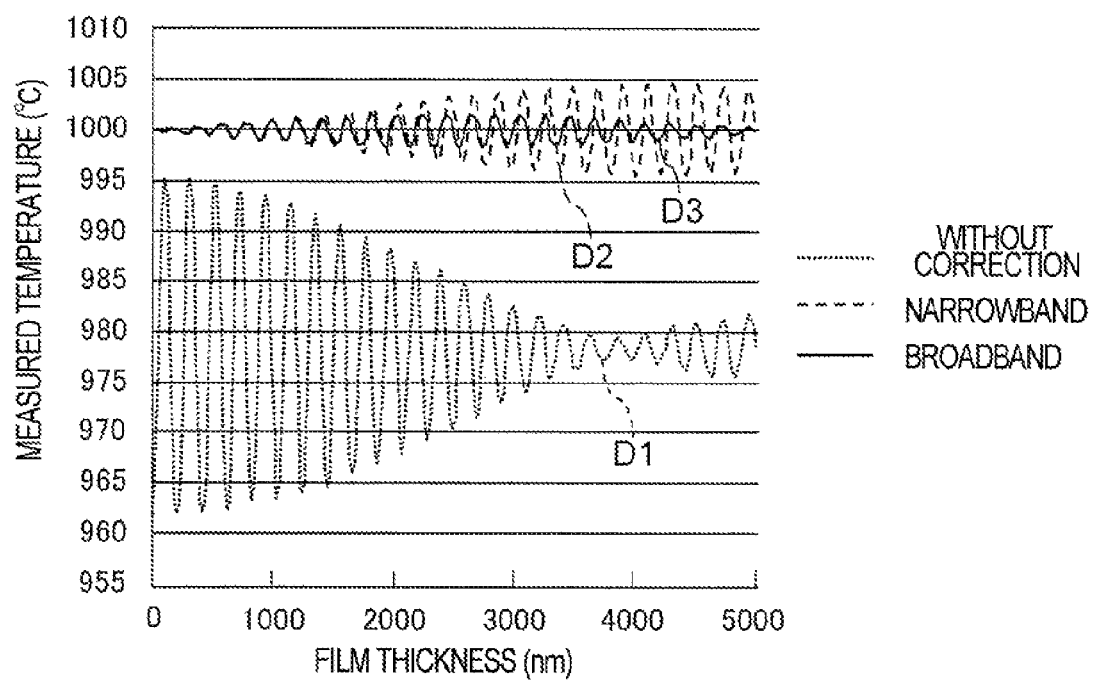
FIG. 7 is a diagram illustrating film thickness dependence of measured temperatures according to one embodiment.

Next, emissivity correction when the temperature of the measuring target object W is calculated will be explained with reference to FIG. 7. FIG. 7 illustrates film thickness dependence of measured temperatures calibrated using reflectivity of each of the narrowband light and the broadband light or without emissivity calibration, that is, the relation between the measured temperatures and the film thickness without correction of emissivity (ratio of radiation) or with correction of emissivity.

In the example of FIG. 7, with respect to heat radiation intensity by model calculation, correction of emissivity is performed by using the reflectivity (R) illustrated in FIG. 6, so as to obtain the temperature of the measuring target object W. The procedure of the model calculation is such that the temperature of the measuring target object W is 1000° C., and the emissivity ($\epsilon$) is calculated by $\epsilon=1-R$ as equation (1). Note that the heat radiation intensity is obtained as an integral value in a wavelength range of 950 nm±25 nm.

As illustrated in FIG. 7, when the correction of emissivity is not performed (see D1 in FIG. 7), the measured temperatures oscillate around approximately 978° C., and the amplitude of oscillations of the measured temperatures is about ±17° C. at most. On the other hand, when the reflectivity is measured by using the light source in which the width at half maximum of the emission spectrum of the narrowband light is 37 nm so as to perform the emissivity correction (see D2 in FIG. 7), the center value of the measured temperatures is 1000° C., and the amplitude of oscillations is reduced to about ±5° C. Moreover, when the emissivity correction is made based on the reflectivity measured by using the light source in which the width at half maximum of the emission spectrum of the broadband light is 200 nm (see D3 in FIG. 7), the measured temperatures fall within a range of ±2° C. around 1000° C. Thus, by setting the width at half maximum of the emission spectrum of the broadband light source 2 for measuring the reflectivity to be equal to or more than at least the width H1 of the measuring wavelength range, the thermometry precision can be improved without narrowing the wavelength range for measuring heat radiation intensity.

Figure 8:
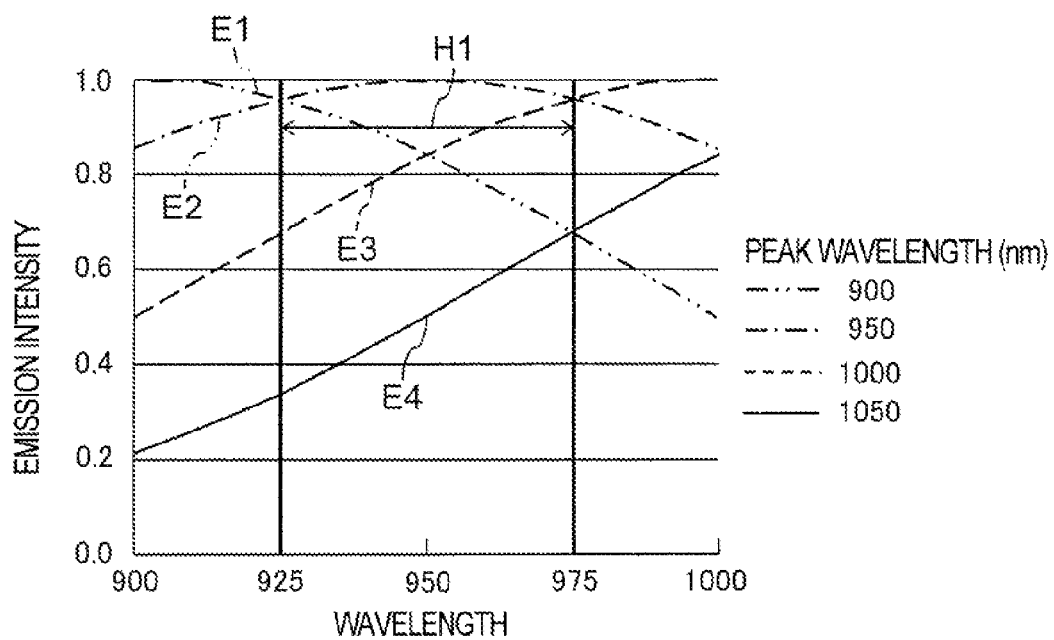
FIG. 8 is a diagram illustrating emission spectra of broadband light according to one embodiment.

Next, errors in measured temperature due to differences in peak wavelengths of the emission spectrum of the broadband light will be explained with reference to FIG. 8 to FIG. 10. FIG. 8 illustrates emission spectra of light sources with a width at half maximum of 200 nm and peak wavelengths of 900 nm, 950 nm, 1000 nm and 1050 nm. Note that the measuring wavelength range is ±25 nm (width H1 of the wavelength range=50 nm) around 950 nm. Further, FIG. 9 illustrates the peak wavelength dependence of the amplitude of temperatures, that is, the relation between temperature errors and peak wavelengths.

As illustrated in FIG. 8, when the peak wavelength of the broadband light is 900 nm (see E1 in FIG. 8), the light intensity (that is, heat radiation intensity) decreases according to increase in the wavelength of light over the measuring wavelength range, and when it is 950 nm (see E2 in FIG. 8), the light intensity increases according to increase in the wavelength of light when the wavelength is below 950 nm and decreases in the measuring wavelength range above 950 nm. On the other hand, when the peak wavelength of the broadband light is 1000 nm or 1050 nm, (see E3 and E4 in FIG. 8), the light intensity increases according to increase in the wavelength of light over the measuring wavelength range.

Figure 9:
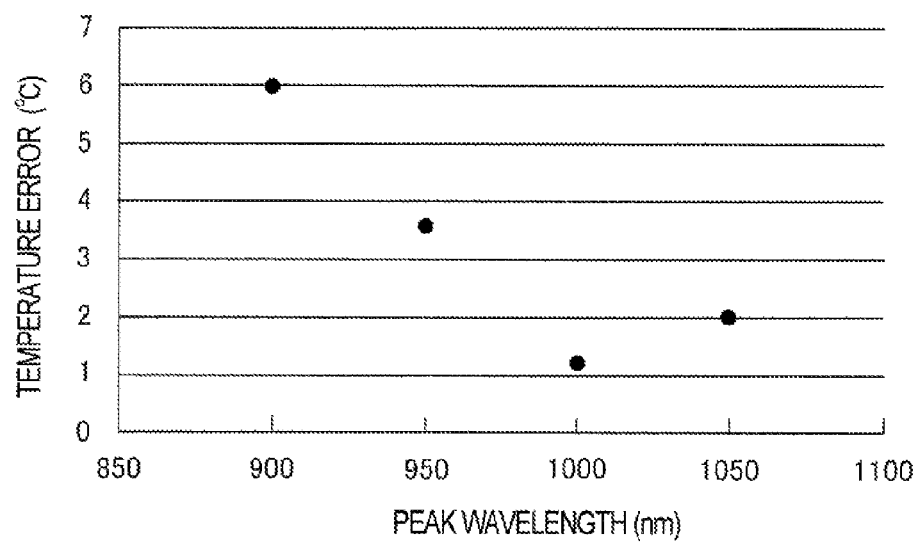
FIG. 9 is a diagram illustrating peak wavelength dependence of the amplitude of temperatures oscillation according to one embodiment.

As illustrated in FIG. 9, the temperature error is as large as 6° C. when the peak wavelength of the broadband light is 900 nm, and is about 3.6° C. when it is 950 nm. On the other hand, the temperature error is as small as about 1.2° C. when the peak wavelength of the broadband light is 1000 nm, and is about 2° C. when it is 1050 nm. Accordingly, when a light source in which the peak wavelength of the broadband light is 1000 nm or 1050 nm, that is, a light source which generates light with a peak wavelength longer than the measuring wavelength range for measuring heat radiation intensity and with light intensity which increases according to increase in wavelength over the measuring wavelength range is used as the broadband light source 2 for performing measurement, the temperature error of the measuring target object W obtained by correcting the emissivity can be made very small.

Figure 10:
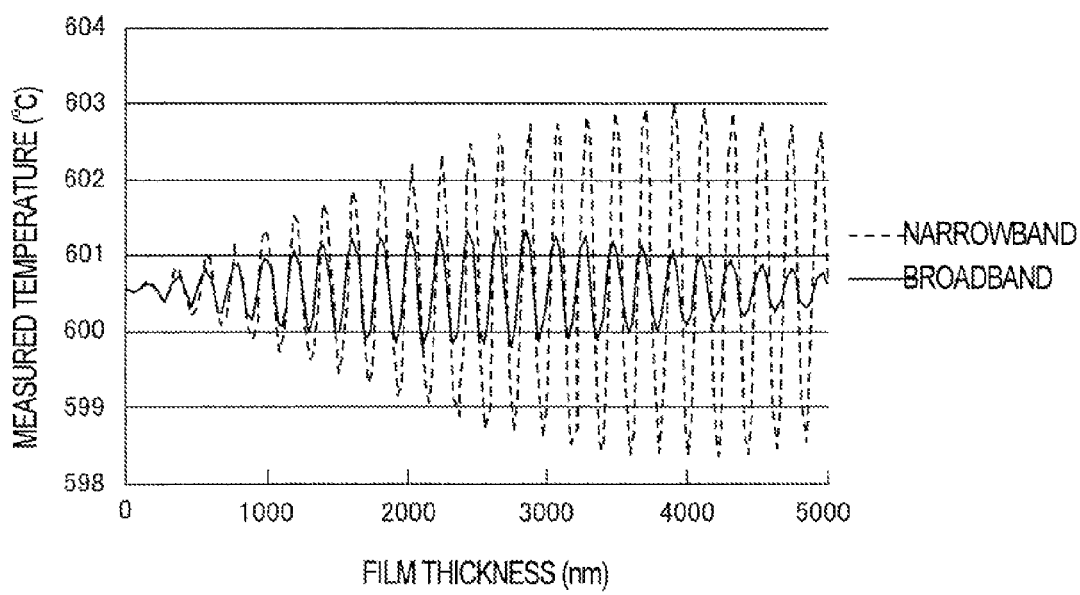
FIG. 10 is a diagram illustrating film thickness dependence of measured temperatures according to one embodiment.

FIG. 10 illustrates the film thickness dependence of GaN at measured temperatures in this embodiment when a light source in which the peak wavelength of the broadband light is 1000 nm is used and the temperature of the measuring target is 600° C. Note that for comparison, a case that a conventional narrowband light source (width at half maximum: 37 nm, peak wavelength: 950 nm) is used as the light source for measuring reflectivity is illustrated together. Calibration of temperature is assumed to be performed at 1000° C. by using a substrate before a film is formed. The measured temperatures vibrate around approximately 600.6° C., and the amplitude of the measured temperatures increases until the film thickness becomes about 2.5 μm from 0 μm, and it becomes about ±0.8° C. at most when the film thickness is about 2.5 μm (about 1.6° C. as the amplitude of the temperatures), and thereafter the amplitude becomes smaller as the film thickness increases. On the other hand, when the conventional narrowband light source is used, the amplitude of the temperatures is about 5° C. at most. The difference in amplitude from the one using the narrowband light source becomes largest at thickness of GaN of from 4 μm to 5 μm.

Therefore, by using the light source generating light having light intensity which increases according to increase in wavelength over the measuring wavelength range, the thermometry precision can be improved without narrowing the wavelength range for measuring heat radiation intensity. Moreover, it can be seen that the error is small even in thermometry at a low temperature of about 600° C. which is considerably apart from the calibrated temperature. Further, it can be seen that a significant difference from one using the narrowband light source is obtained when the film thickness is 1 μm or more.

Figures 11, 12:
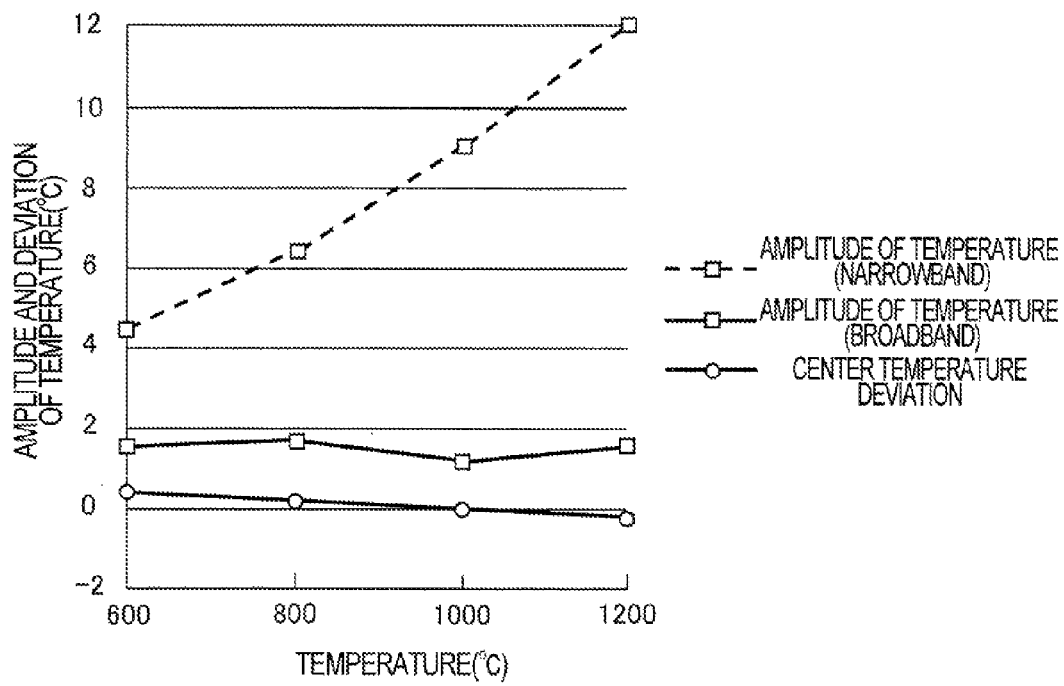
FIG. 11 is a diagram illustrating temperature dependence of the amplitude of measured temperatures oscillation according to one embodiment.
FIG. 12 is a diagram illustrating Ph/Pl of each of $\lambda 0$ and $\Delta \lambda$ according to one embodiment.
Figure 13:
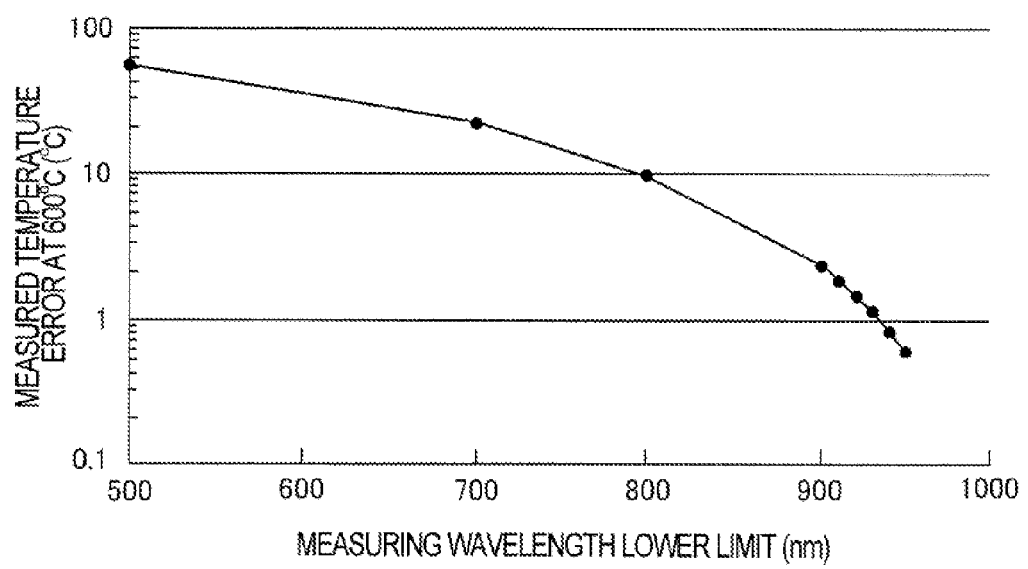
FIG. 13 is a diagram illustrating a dependence of errors in temperature measured at 600° C. on lower limit of measuring wavelength range.

FIG. 11 is a diagram illustrating temperature dependence of the amplitude of temperatures by using a light source similar to the above-described one. As described above, the measured temperatures vibrate as the film thickness of the thin film formed on the substrate increases, but as illustrated in FIG. 10, there is almost no difference in the center value of vibrating measured temperatures between the conventional art using the narrowband light source and this embodiment using the broadband light source. A result of subtracting the temperature of the measuring target from this center temperature is taken as a center temperature deviation. The center temperature deviation gradually decreases and comes within 1° C. when the temperature of the measuring target is in the range of 600° C. to 1200° C. On the other hand, in the conventional art using the narrowband light source, the amplitude of temperatures increases as the temperature of the measuring target becomes high, and increases from slightly less than 5° C. to 12° C. when the temperature of the measuring target is in the range of 600° C. to 1200° C. On the other hand, in the case of this embodiment using the broadband light source, the amplitude is smaller than 2° C. in the above-described measured temperature range.

As described above, even when the film thickness of the film to be formed on the substrate is as thick as 1 μm or more, measurement with high precision can be performed. Further, the same is true when the measured temperature changes largely, for example from 600° C. to 1200° C. Therefore, it is very effective particularly in a formation process having a large temperature difference in a wide film thickness range.

Here, normally as an external light source for measuring reflectivity, a light emitting diode (LED) with a small width at half maximum of an emission spectrum is often used. This is because the LED is useful in handling and is inexpensive, has sufficient emission intensity for measuring reflectivity, and is capable of measuring reflectivity with a peak wavelength of the emission spectrum of the LED by using the LED with a small width at half maximum of the emission spectrum.

On the other hand, in this embodiment, contrary to the above, as the light source for measuring reflectivity, the broadband light source 2 having a wide width at half maximum of an emission spectrum is used. Specifically, the broadband light source 2 in which the width at half maximum of an emission spectrum of the light source is equal to or more than the width of the measuring wavelength range for measuring heat radiation intensity is used. When the emission spectrum of the broadband light source 2 has several peaks, it is preferred that the width at half maximum with respect to the largest peak within, the measuring wavelength range for measuring heat radiation intensity be equal to or more than the width of the measuring wavelength range.

Note that by widening of the width at half maximum of the emission spectrum, the measured value of the emission spectrum is strongly affected by the effect of interference of the thin film formed on the measuring target object W, but the amplitude of reflectivity vibrating according to a change in the film thickness becomes small accompanying an increase in the film thickness. By making correction of the emissivity of heat radiation intensity by using the reflectivity with decreasing amplitude, the thermometry precision can be improved.

The measuring wavelength range for measuring heat radiation intensity can be determined appropriately according to the temperature to be measured of the measuring target. In manufacturing of a compound semiconductor by MOCVD or MBE, the substrate is heated in a temperature range of about 500° C. or more and 1200° C. or less in most cases. In this case, as the wavelength for measuring heat radiation intensity, setting a wavelength of 400 nm or more and 3000 nm or less is preferred because measurement precision of temperature becomes high. More preferably, it is set between 600 nm or more and 2000 nm or less, more preferably between 800 nm or more and 1500 nm or less. Further, when measurement at a higher temperature than the above-described temperature range is necessary, the above-described wavelength range may be set shorter, or conversely when measurement at a lower temperature is necessary, the above-described wavelength range may be set longer.

Further, the width H1 of the wavelength range for measuring heat radiation intensity is determined by necessary precision and lower limit of temperature, upper limit of measurement time, and so on. In the case of the above-described manufacturing apparatus of compound semiconductor, when precision of temperature is ±2° C., the temperature of measuring lower limit is 500° C., and the measurement time is 1 millisecond, the width of the wavelength range for measuring heat radiation intensity is preferably at least 20 nm or more because the measurement, precision becomes high. More preferably, it is 30 nm or more, furthermore preferably 40 nm or more, most preferably 50 nm or more.

Further, for the broadband light source 2 for measuring reflectivity, as already described, the width at half maximum of the emission spectrum and the emission peak position of the light source with respect to the above-described measuring wavelength range for measuring heat radiation intensity are important. Specifically, the width at half maximum of the emission spectrum of the broadband light source 2 needs to be one time or more as compared to the width H1 of the measuring wavelength range for measuring heat radiation intensity (more preferably, 1.5 times or more, furthermore preferably 2 times or more). Further, it is necessary that the peak wavelength be larger than the measuring wavelength range and generate light with light intensity increasing according to a wavelength increase over the measuring wavelength range. When the light transmission spectrum of the optical filter 4 which determines the measuring wavelength range is not steep and the measuring wavelength range cannot be determined precisely, it is also possible to define the width at half maximum of the transmission spectrum as the measuring wavelength range.

As the light source which can be used in this embodiment, publicly known ones such as a halogen lamp, an LED, a supercontinuum light source, a multi-wavelength surface emitting laser, and the like may be used solely or in combination. Further, in order to make the emission spectrum of the light source preferable, it can be used in combination with an appropriate optical filter. Further, in the case of LED, multiple LED lamps with different emission wavelengths or LED chips may be used in combination. Further, one in which an active layer with a different emission wavelength is layered in one LED chip can be used.

Note that even when the emission spectrum of the broadband light source 2 has a small side peak in the wavelength region of a shoulder of a major peak, as the peak wavelength of the emission spectrum of the broadband light source 2, a wavelength for a peak on which an overall characteristic of the emission spectrum monitored in the measuring wavelength range depends on is taken. Further, in the above explanation, the emission spectrum of the broadband light source 2 is on the assumption that it is smooth and continuous in the measuring wavelength range for measuring heat radiation intensity, but it is not limited to this and may be formed of line spectra which are discrete at relatively small wavelength intervals, which are substantially equal intervals.

However, when the number of line spectra contained in this wavelength range is small, the effects related to this embodiment do not become significant. Thus, the number of line spectra contained in the wavelength range for measuring heat radiation intensity is desirably 5 or more, more preferably 7 or more, further preferably 10 or more. By sequentially connecting emission intensity at peak wavelengths of these line spectra, it is also possible to obtain a pseudo-continuous spectrum. The width at half maximum of the emission spectrum of the broadband light source 2 can be defined by this pseudo-continuous spectrum. In this case, for the peak wavelength of the emission spectrum of the broadband light source 2, it is defined as a case that the intensity of the aforementioned pseudo-continuous spectrum is increasing mostly on a long wavelength side within the measuring wavelength range for measuring heat radiation intensity.

As described above, according to the embodiment, the emission spectrum of the broadband light of the broadband light source 2 is a spectrum with a width at half maximum which is equal to or more than the width H1 of the measuring wavelength range, and with light intensity increasing according to wavelength increase in the measuring wavelength range, and thus light from the broadband light source 2 received by the light receiver 5 becomes light with light intensity increasing while a wavelength thereof becomes a long wavelength, and the heat radiation spectrum of received light becomes dose to the heat radiation spectrum of the blackbody. This can be considered as a reason for that without changing the wavelength range for measuring heat radiation intensity, decrease in the precision and the signal strength of heat radiation intensity can be suppressed so as to improve thermometry precision.

Emission wavelength dependence in the measuring wavelength range of heat radiation intensity based on this principle is as follows. Specifically, when the measured temperature range is the range of about 800° C. to 1100° C., dividing the heat radiation intensity (Ph) at the upper limit of the measuring wavelength range by heat radiation intensity (Pl) at the lower limit of the measuring wavelength range results in the following relation.

$$Ph/Pl = 9.8 \times \exp(\Delta\lambda \times \xi)$$

Here, exp is an exponential function with respect to the base of a natural logarithm, $\Delta\lambda$ is the measuring wavelength range (in unit of μm) of heat radiation intensity, and $\xi$ is a function for the center wavelength (hereinafter described as $\lambda 0$, in unit of μm) of the measuring wavelength range of heat radiation intensity, which is represented as $$\xi = -29.8 \times \lambda 0 + 36.8$$

FIG. 12 illustrates a preferred range of Ph/Pl with respect to several specific $\lambda 0$ and $\Delta\lambda$. For example, when the center wavelength ($\lambda 0$) of the wavelength range for measuring heat radiation intensity is 0.9 μm and the width ($\Delta\lambda$) of the wavelength of a measuring range is 0.1 μm (measuring wavelength range is 0.85 to 0.95 μm), the light intensity of 0.95 μm (upper-limit wavelength) in the broadband light source of this embodiment is preferred to be in the range of 2.1 times to 3.0 times the light intensity of 0.85 μm (lower-limit wavelength). Further, when the range of the center wavelength ($\lambda 0$) of the wavelength range for measuring heat radiation intensity is 0.8 μm to 1.0 μm and the width ($\Delta\lambda$) of the wavelength of a measuring range is 0.05 μm to 0.20 μm, the light intensity (Ph) of the upper limit in the broadband light source of this embodiment is preferred to be in the range of 1.3 times to 20 times of the light intensity (Pl) of the lower limit.

Note that in the explanation hitherto, the case of forming a film of GaN on the silicon substrate as a measuring target has been described, but it can be used also for a transparent substrate such as sapphire. However, in this case, when the thin film to be formed is light transmitting, the measuring target is a substrate retaining jig (susceptor) which is not transmitting light. Further, the material of the thin film formed on the substrate is not limited to GaN, but can be used for general thin film materials. Specific examples of the thin film materials include compound semiconductors represented by aluminum nitride (AlN), gallium arsenide (GaAs), zinc selenide (ZnSe), and the like and mixed crystals thereof, group-IV semiconductor represented by silicon, germanium, and mixed crystals thereof, amorphous materials such as silicon nitride, silicon oxide, and the like. Further, a layered structure of them is the same.

Further, in the above-described embodiment, film formation by MOCVD or MBE is exemplified as a main application example, but as long as there is a possibility that a temperature change of a substrate accompanying film formation occurs, it is not limited to MOCVD or MBE, is applicable to methods such as sputtering or vapor deposition, and is further applicable to general thermometry not limited to film formation. Further, regarding the configuration of the above-described radiation thermometer 1, the configuration illustrated in FIG. 1 is one example, but various changes can be added to this component, a configuration method thereof, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A radiation thermometer, comprising:
   a broadband light source configured to generate broadband light to be irradiated to a measuring target object;
   an optical filter configured to, when the broadband light generated by the broadband light source is incident on the measuring target object, pass only light in a predetermined wavelength range of reflected light reflected by the measuring target object and heat radiation light radiated from the measuring target object;
   a light receiver configured to receive the light in the predetermined wavelength range which passed through the optical filter; and
   a calculator configured to calculate a temperature of the measuring target object by using reflected light intensity and heat radiation intensity of the light in the predetermined wavelength range received by the light receiver,
   wherein an emission spectrum of the broadband light is a spectrum with a full width at half maximum which is equal to or wider than the predetermined wavelength range, and with light intensity increasing while a wavelength thereof becomes longer in the predetermined wavelength range.

2. The radiation thermometer according to claim 1, wherein the width of the predetermined wavelength range is 20 nm or more and 200 nm or less.

3. The radiation thermometer according to claim 2, wherein the width of the predetermined wavelength range is 50 nm or more and 200 nm or less.

4. The radiation thermometer according to claim 1, wherein the broadband light is light in which light intensity of an upper-limit wavelength of the predetermined wavelength range is 1.3 times or more and 20 times or less of light intensity of a lower-limit wavelength of the predetermined wavelength range.

5. The radiation thermometer according to claim 1, wherein the calculator calculates the temperature of the measuring target object based on heat radiation intensity radiated by a blackbody at a same temperature as the measuring target object.

6. The radiation thermometer according to claim 1, further comprising a controller configured to blink the broadband light generated by the broadband light source at a predetermined cycle,
   wherein the calculator separates signals of the reflected light intensity and the heat radiation intensity in the light from the measuring target object detected by the light receiver in the predetermined wavelength range based on the predetermined cycle.

7. The radiation thermometer according to claim 1, wherein the reflected light intensity and the heat radiation intensity are a wavelength integral in the predetermined wavelength range or an average value in the predetermined wavelength range.

8. The radiation thermometer according to claim 1, wherein emissivity is corrected based on reflectivity of the broadband light irradiated from the broadband light source and reflected by the measuring target object, so as to obtain the heat radiation intensity.

9. The radiation thermometer according to claim 1, wherein a peak wavelength of the broadband light is longer than an upper-limit of the predetermined wavelength range.

10. The radiation thermometer according to claim 1, wherein a lower-limit of the wavelength range is 400 nm or more, and an upper-limit of the wavelength range is 3000 nm or less.

11. The radiation thermometer according to claim 10, wherein a lower-limit of the wavelength range is 800 nm or more, and an upper-limit of the wavelength range is 1500 nm or less.

12. The radiation thermometer according to claim 1, wherein a full width at half maximum of the emission spectrum of the broadband light is 1.5 times or more of the width of the predetermined wavelength range.

13. The radiation thermometer according to claim 12, wherein a full width at half maximum of the emission spectrum of the broadband light is two times or more of the width of the predetermined wavelength range.

14. A thermometry method, comprising the steps of:

generating broadband light by a broadband light source;

irradiating the broadband light generated by the broadband light source to a measuring target object;

passing through an optical filter only light in a predetermined wavelength range of reflected light reflected by the measuring target object and heat radiation light radiated from the measuring target object;

receiving by a light receiver the light in the predetermined wavelength range which passed through the optical filter; and calculating by a calculator a temperature of the measuring target object by using reflected light intensity and heat radiation intensity of the light in the predetermined wavelength range received by the light receiver, wherein an emission spectrum of the broadband light is a spectrum with a full width at half maximum which is equal to or more than a width of the predetermined wavelength range, and with light intensity increasing while a wavelength thereof becomes longer in the predetermined wavelength range.

15. The thermometry method according to claim 14, wherein the width of the predetermined wavelength range is 50 nm or more and 200 nm or less.

* * * * *